United States Patent
Chang et al.

(10) Patent No.: US 9,653,070 B2
(45) Date of Patent: May 16, 2017

(54) FLEXIBLE ARCHITECTURE FOR ACOUSTIC SIGNAL PROCESSING ENGINE

(71) Applicant: Intel Corporation, Santa Clara, CA (US)

(72) Inventors: Jenny Chang, San Ramon, CA (US); Michael E. Deisher, Hillsboro, OR (US); Ravishankar Iyer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 13/732,329

(22) Filed: Dec. 31, 2012

(65) Prior Publication Data

US 2014/0188470 A1 Jul. 3, 2014

(51) Int. Cl.

| | | |
|---|---|---|
| *G10L 15/00* | (2013.01) | |
| *G10L 15/14* | (2006.01) | |
| *H04L 12/28* | (2006.01) | |
| *H04M 1/64* | (2006.01) | |
| *G06F 7/00* | (2006.01) | |
| *G06K 9/00* | (2006.01) | |

(52) U.S. Cl.
CPC .................................. *G10L 15/14* (2013.01)

(58) Field of Classification Search
USPC ......... 704/236, 233, 246, 10, 235, 251, 200, 704/242, 244, 231, 256; 370/392; 382/115; 340/5.52; 379/88.01
See application file for complete search history.

(56) References Cited

U.S. PATENT DOCUMENTS

| | | | |
|---|---|---|---|
| 5,271,088 A | * | 12/1993 | Bahler ................. G10L 21/028 704/200 |
| 5,953,701 A | | 9/1999 | Neti et al. |
| 5,960,397 A | | 9/1999 | Rahim |
| 6,029,124 A | | 2/2000 | Gillkk et al. |
| 6,260,013 B1 | | 7/2001 | Sejnoha |
| 6,421,645 B1 | | 7/2002 | Beigi et al. |

(Continued)

OTHER PUBLICATIONS

Robust Text-Independent Speaker Identification Using Gaussian Mixture Speaker Models by D. A. Reynolds and R.C. Rose, IEEE transactions on speech and audio processing, 1995.*

*Primary Examiner* — Pierre-Louis Desir
*Assistant Examiner* — Neeraj Sharma
(74) *Attorney, Agent, or Firm* — Trop, Pruner & Hu, P.C.

(57) ABSTRACT

A disclosed speech processor includes a front end to receive a speech input and generate a feature vector indicative of a portion of the speech input and a Gaussian mixture (GMM) circuit to receive the feature vector, model any one of a plurality of GMM speech recognition algorithms, and generate a GMM score for the feature vector based on the GMM speech recognition algorithm modeled. In at least one embodiment, the GMM circuit includes a common compute block to generate feature a vector sum indicative of a weighted sum of differences squares between the feature vector and a mixture component of the GMM speech recognition algorithm. In at least one embodiment, the GMM speech recognition algorithm being modeled includes a plurality of Gaussian mixture components and the common compute block is operable to generate feature vector scores corresponding to each of the plurality of mixture components.

6 Claims, 10 Drawing Sheets

(56) References Cited

U.S. PATENT DOCUMENTS

| | | |
|---|---|---|
| 6,424,946 B1 | 7/2002 | Tritschler et al. |
| 6,574,597 B1 | 6/2003 | Mohri et al. |
| 6,580,814 B1 * | 6/2003 | Ittycheriah ......... G06K 9/00885 340/5.52 |
| 6,681,207 B2 * | 1/2004 | Garudadri ............... G10L 15/06 704/241 |
| 7,165,028 B2 | 1/2007 | Gong |
| 7,254,538 B1 | 8/2007 | Hermansky et al. |
| 7,379,868 B2 * | 5/2008 | Reynolds ................ G10L 15/07 704/238 |
| 7,389,233 B1 | 6/2008 | Gish et al. |
| 7,418,383 B2 | 8/2008 | Droppo et al. |
| 7,447,633 B2 | 11/2008 | Navratil et al. |
| 7,454,338 B2 | 11/2008 | Seltzer et al. |
| 7,454,342 B2 | 11/2008 | Nefian et al. |
| 7,464,031 B2 | 12/2008 | Axelrod |
| 7,472,063 B2 | 12/2008 | Nefian et al. |
| 7,480,617 B2 | 1/2009 | Chu et al. |
| 7,636,659 B1 | 12/2009 | Athineos et al. |
| 7,664,643 B2 | 2/2010 | Gopinath et al. |
| 7,672,838 B1 | 3/2010 | Athineos et al. |
| 7,707,029 B2 | 4/2010 | Seltzer et al. |
| 7,720,683 B1 | 5/2010 | Vermevlen et al. |
| 7,769,583 B2 * | 8/2010 | Chaudhari ............... G10L 17/06 379/88.01 |
| 7,813,927 B2 | 10/2010 | Navratil et al. |
| 7,844,456 B2 | 11/2010 | Cai et al. |
| 8,121,840 B2 | 2/2012 | Chu et al. |
| 8,175,872 B2 | 5/2012 | Kristjansson et al. |
| 8,234,111 B2 | 7/2012 | Lloyd et al. |
| 8,249,868 B2 | 8/2012 | Lloyd et al. |
| 8,265,928 B2 | 9/2012 | Kristjansson et al. |
| 8,346,551 B2 | 1/2013 | Herbig et al. |
| 8,504,366 B2 * | 8/2013 | Hagai et al. ................... 704/246 |
| 8,583,432 B1 * | 11/2013 | Biadsy .................. G10L 15/063 704/10 |
| 2004/0186718 A1 | 9/2004 | Nefian et al. |
| 2005/0159952 A1 | 7/2005 | Nguyen et al. |
| 2006/0053008 A1 | 3/2006 | Droppo et al. |
| 2006/0074667 A1 | 4/2006 | Saffer |
| 2006/0178871 A1 | 8/2006 | Seltzer et al. |
| 2006/0178875 A1 | 8/2006 | Seltzer et al. |
| 2007/0203694 A1 * | 8/2007 | Chan ....................... G10L 25/69 704/200.1 |
| 2008/0114596 A1 | 5/2008 | Acero et al. |
| 2008/0221896 A1 | 9/2008 | Cai et al. |
| 2008/0300871 A1 | 12/2008 | Gilbert |
| 2009/0076814 A1 * | 3/2009 | Lee ........................ G10L 25/78 704/233 |
| 2010/0004931 A1 * | 1/2010 | Ma ........................ G10L 15/08 704/244 |
| 2010/0138222 A1 | 6/2010 | Herbig et al. |
| 2010/0161332 A1 | 6/2010 | Seltzer et al. |
| 2010/0198598 A1 | 8/2010 | Herbig et al. |
| 2010/0262423 A1 | 10/2010 | Huo et al. |
| 2010/0312560 A1 | 12/2010 | Ljolje et al. |
| 2010/0332228 A1 * | 12/2010 | Deisher ................ G10L 15/285 704/242 |
| 2012/0095762 A1 | 4/2012 | Eom et al. |
| 2013/0006623 A1 * | 1/2013 | Chelba et al. ................. 704/233 |
| 2014/0163978 A1 * | 6/2014 | Basye et al. ................... 704/233 |
| 2014/0180690 A1 * | 6/2014 | Fastow ................ G10L 15/285 704/251 |
| 2015/0146726 A1 * | 5/2015 | Zhao ............................. 370/392 |

* cited by examiner

FLEXIBLE ARCHITECTURE FOR ACOUSTIC SIGNAL PROCESSING ENGINE

FIELD

Disclosed subject matter relates to acoustic signal processing and, in particular, the processing of speech and other acoustic signals using a Gaussian mixture model.

BACKGROUND

Automated electronic processing of speech and other acoustic signals is challenging due, in part, to the wide variety of pronunciations, accents, and speech characteristics of individual speakers. Constraints such as language models and acoustic models are used to make decisions about the words the user speaks, but acoustic models are often mathematically intensive. What is needed is a flexible, efficient, and robust way of achieving speech recognition in a device, such as a mobile phone, tablet, or other computing device.

DESCRIPTION

Figure 1:
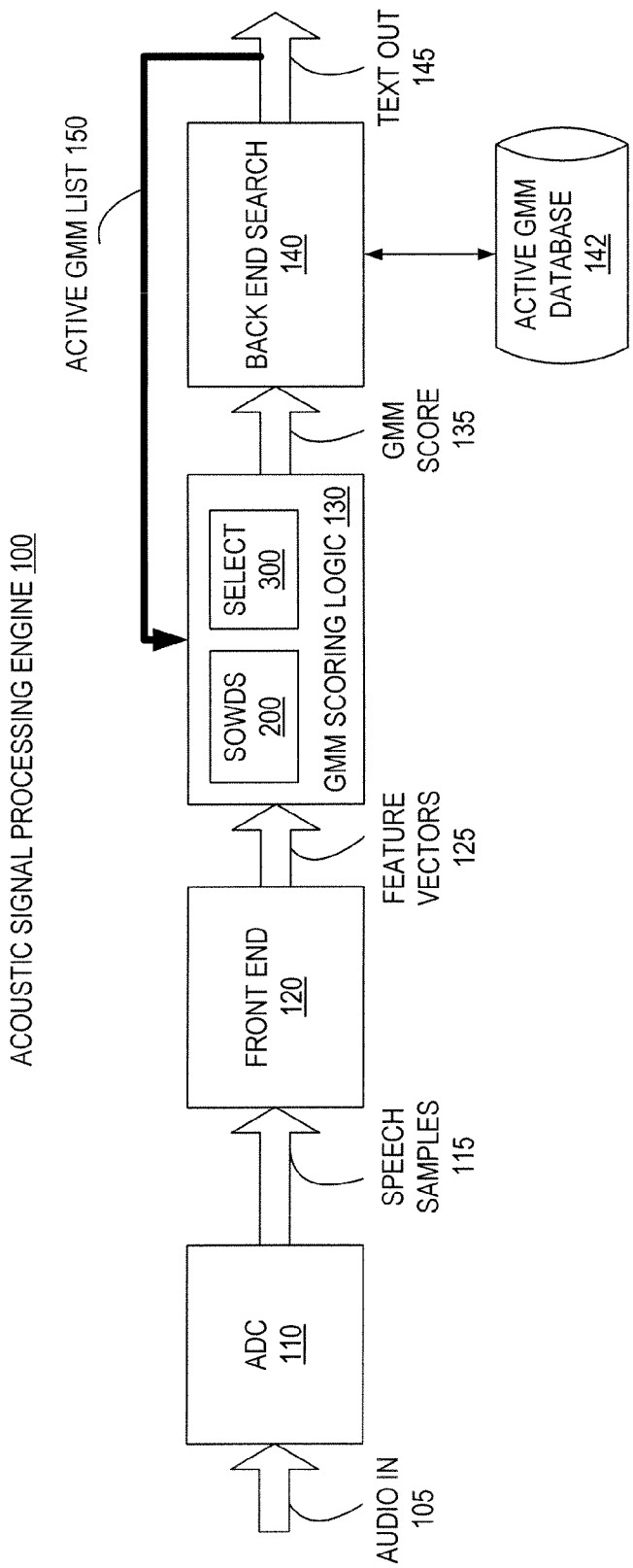
FIG. 1 illustrates a Gaussian mixture-based acoustic signal processing engine used in conjunction with at least one embodiment.

Embodiments of the invention pertain to a technique for providing speech recognition using a Gaussian mixture model (GMM). An advantage of using GMMs to perform acoustic signal processing is that GMMs are capable of representing a large class of sample distributions in an overall population. A powerful attribute of a GMM is its ability to form smooth approximations of arbitrarily shaped densities. In one embodiment, a disclosed speech recognition technique includes a GMM, whereas in other embodiments, other models may be used. In one embodiment, a speech recognition technique includes logic to support large-vocabulary continuous speech recognition for mobile or other computing devices.

In one embodiment, acoustic modeling of speech includes establishing statistical representations of feature vector sequences computed from a speech waveform. In one embodiment, acoustic modeling includes pronunciation modeling, wherein a sequence of multi-sequences of fundamental speech units are used to represent larger speech units such as words or phrases which are the object of speech recognition. In some embodiments, acoustic modeling may also include the use of feedback information from the recognizer to reshape the feature vectors of speech.

At least one embodiment includes a flexible architecture for implementing a GMM to support multiple speech recognition algorithms. In at least one embodiment, the GMM architecture may be at least partially implemented as logic in a semiconductor device, such as a general purpose microprocessor, system-on-a-chip, audio signal processing, or other device. In at least one embodiment, GMM logic may be integrated within an execution core of a processor while, in other embodiments, the GMM logic may be implemented as an accelerator or coprocessor. In still other embodiments, GMM logic may be implemented in an I/O device in communication with an I/O hub or chipset device.

In at least one embodiment, disclosed GMM scoring logic is suitable for use in a mobile platform that may include a system-on-chip, embedded, or other type of mobility-optimized processor. In at least one embodiment, GMM scoring logic may be implemented as an I/O or peripheral device in communication with a system's process via a chipset or other intermediary. These embodiments may include application program software and/or driver software to access the GMM scoring logic.

In at least one embodiment, disclosed GMM scoring logic includes an input to receive a feature vector indicative of a portion of speech or another acoustic signal and logic to model any one of a plurality of GMM speech recognition algorithms, and generate a GMM score for the feature vector based on the GMM speech recognition algorithm modeled. In at least one embodiment, the GMM circuit includes a common compute block to generate a vector sum indicative of a weighted sum of differences squared between the feature vector and a mixture component of the applicable GMM speech recognition algorithm. In at least one embodiment, the GMM speech recognition algorithm being modeled includes a plurality of Gaussian mixture components, each having an associated mean and variance, and the common compute block is operable to generate feature vector scores corresponding to each of the plurality of mixture components.

In at least one embodiment, GMM scoring logic includes a score selection block to receive feature vector scores and algorithm inputs, implement the modeled GMM speech recognition algorithm based on the algorithm inputs, and generate the GMM score for the modeled speech recognition algorithm based on the feature vector scores. In at least one embodiment, the GMM scoring logic supports algorithms that employ logarithmic summation as well as algorithms that employ a maximum algorithm inputs include a logarithmic summation mode input indicative of whether the applicable GMM speech recognition algorithm implements a logarithmic summation calculation to determine the GMM score.

In at least one mobile platform embodiment, a mobile device such as a tablet device or a smartphone device includes a processing core to execute instruction set instructions, machine readable storage to store instructions executable by the processing core, and a power manager to receive power from a battery and provide power to the processing core and other components of the mobile device platform. The mobile device embodiment may further include a radio frequency transceiver to establish a wireless communication transport, a touchscreen display to receive touch input, and an audio coder/decoder to receive audio input and generate a feature vector comprising a digital representation the audio input. In at least one embodiment, the mobile device includes GMM scoring logic to receive algorithm inputs indicating which of a plurality of supported GMM speech recognition algorithms is selected. The GMM scoring logic may generate a GMM score for the feature vector based on the GMM speech recognition algorithm indicated by the algorithm inputs. In at least one embodiment, the mobile device is operable to initiate a search for text based on the GMM scoring logic by the GMM scoring logic. In at least one embodiment, the mobile device transmits the GMM score via the wireless communication transport to a remote search engine.

In at least one embodiment, the GMM scoring logic includes a sum of differences squared circuit to receive the feature vector and generate a GMM sum indicative of a weighted sum of differences squared between the feature vector and a mixture component of the applicable GMM speech recognition algorithm. In at least one embodiment, the speech recognition algorithm includes a plurality of mixture components and the sum of differences squared circuit is invoked once for each mixture component to generate a plurality of GMM sums corresponding to the feature vector. In at least one embodiment, the GMM scoring logic includes score processing logic to determine the GMM score based on the plurality of GMM sums received from the sum of differences squared. In at least one embodiment, the score processing logic supports logarithmic summation score processing techniques as well as maximum minimum score processing and the score processing logic receives configuration inputs to indicate the score processing technique associated with the application GMM speech recognition algorithm.

In at least one embodiment, a disclosed processor includes a processing core to execute instruction set instructions, an audio interface to receive feature vector data, where the feature vector includes a digital representation of a speech sample, and a GMM scoring logic to generate a GMM score corresponding to the feature vector. The GMM scoring logic may include weighted sum of differences squared (SODS) logic to compute a GMM sum indicative of differences between elements of the feature vector and corresponding elements of a GMM component mixture. At least one embodiment of the GMM scoring logic includes algorithm selection logic to select a first GMM scoring algorithm from a plurality of supported GMM scoring algorithms including a logarithmic summation scoring algorithm and a maximum summation scoring algorithm. In at least one embodiment, the SODS logic includes a plurality of stages and each of the stages includes a plurality of circuits to determine a squared value of a difference between two inputs from a preceding stage and a weighting to apply to the squared value.

In at least one embodiment, a disclosed hardware-assisted speech recognition application program is implemented as a computer readable storage medium that includes processor executable instructions, which when executed by the processor, cause the processor to provide algorithm selection inputs indicative of a first speech recognition algorithm to GMM scoring logic, detect a feature vector comprising a digital representation of an interval of speech, invoke the GMM scoring logic to generate a GMM score for the feature vector based on the first speech recognition algorithm, and initiate a search for text based on the GMM score. In at least one embodiment, the instructions to initiate the search include instructions to transmit the GMM score wirelessly to a remotely located speech recognition database and to receive a wirelessly transmitted search result including search result text. In at least one embodiment, the instructions further include instructions to display the text on a display device for use in conjunction with a speech to text application. The application program may further include instructions to select the display text for use in conjunction with other features such as email, text messaging, and social network features.

In at least one embodiment, a disclosed tangible machine readable medium includes a set of information, stored on the medium, representing hardware logic circuits, which if used by a machine, causes the machine to fabricate hardware logic circuits that include first logic to receive a feature vector and compute a sum of weighted differences squared value based on the feature vector and a mixture vector that includes a mean vector and a variance vector. The logic circuits may also include second logic to receive, from the first logic, the sum of weighted differences squared values for each of a plurality of mixture vectors associated with a Gaussian mixture mode implementation. The second logic generates, based on a Gaussian mixture mode scoring algorithm, a Gaussian mixture mode score. In at least one embodiment, the hardware logic circuits support multiple GMM scoring algorithms and the second logic is operable to receive or access scoring algorithm values and computes the GMM score based on a scoring algorithm indicated by the scoring algorithm values.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Referring now to the drawings, FIG. 1 illustrates elements of one embodiment of an acoustic signal processing engine 100 that employs Gaussian mixture model scoring. In the FIG. 1 embodiment, acoustic signal processing engine 100 includes an input to receive audio input 105 that is digitized with an analog-to-digital converter (ADC) 110. Samples 115 from the output of ADC 110 are provided to audio processing hardware and/or software referred to herein as front end 120 to perform pre-emphasis, framing, windowing and computations to extract ceptral coefficient feature vectors 125 from digitized samples 115. In at least one speech recognition embodiment of acoustic signal processing engine 100, a feature vector 125 provided to GMM scoring logic 130 is a numerical representation of an interval of speech input, where the interval of speech may be on the order of approximately 10 ms. In the FIG. 1 embodiment, feature vectors 125 generated by front end 120 are provided to a GMM scoring block 130.

The FIG. 1 embodiment of GMM scoring block 130 may compute scores for sub-phonetic, context dependent units based on feature vectors 125. The FIG. 1 embodiment of GMM scoring block 130 includes sum-of-weighted-differences-squared (SOWDS) logic 200 and score selection logic 300. The SOWDS logic 200 and score selection logic 300 are used to compute or otherwise obtain a GMM score 135 corresponding to each feature vector 125. In the embodiment depicted in FIG. 1, GMM scores 135 are provided to a back end search 140. Back end search 140 may use GMM score 135 as the basis for a search for text corresponding to the GMM score. The search performed by back end search 140 may include a search of a locally stored database referred to as active GMM database 142. Active GMM database 142 may function analogous to a cache memory by storing results of recently performed searches. Back end search 140 may also initiate a remote search by wirelessly or otherwise transmitting GMM score 135 to a remotely located search engine (not depicted in FIG. 1). The FIG. 1 embodiment of back end search 140 generates text output 145 corresponding to GMM score 135.

In at least one embodiment, back end search 140 is implemented at least partially in software to identify a spoken utterance corresponding to GMM score 135 by recursively finding a most likely hidden Markov model (HMM) state trajectory through a series of HMMs. Back end search 140 may, in some embodiments, map the log likelihoods from GMM scoring logic 130 to HMM states that model context dependent phonemes. A maximum likelihood state trajectory may then be determined via a Viterbi algorithm. HMM to HMM transition weightings may be determined according to a pronunciation dictionary that defines a target vocabulary. Word to word transition weightings may then be determined according to a statistical language model. Eventually, a back trace of the most likely path may be provided to determine a set of N-best word sequences.

As indicated previously, the FIG. 1 embodiment of acoustic signal processing engine 100 maintains a cache of search results 150 in active GMM database 142. In this embodiment, acoustic signal processing engine 100 may refer to active GMM database 142 instead of initiating a remote search. Based on the back end search 140 performed in software, the hardware supports the ability to reduce the search space by reducing the number of GMM's to be scored on the next invocation of the hardware through an active GMM list 150. This feature may be optionally disabled to force GMM scoring logic 130 to computer a GMM 135 for each feature vector 125 and to provide the GMM score 135 to back end search 140.

Figure 2:
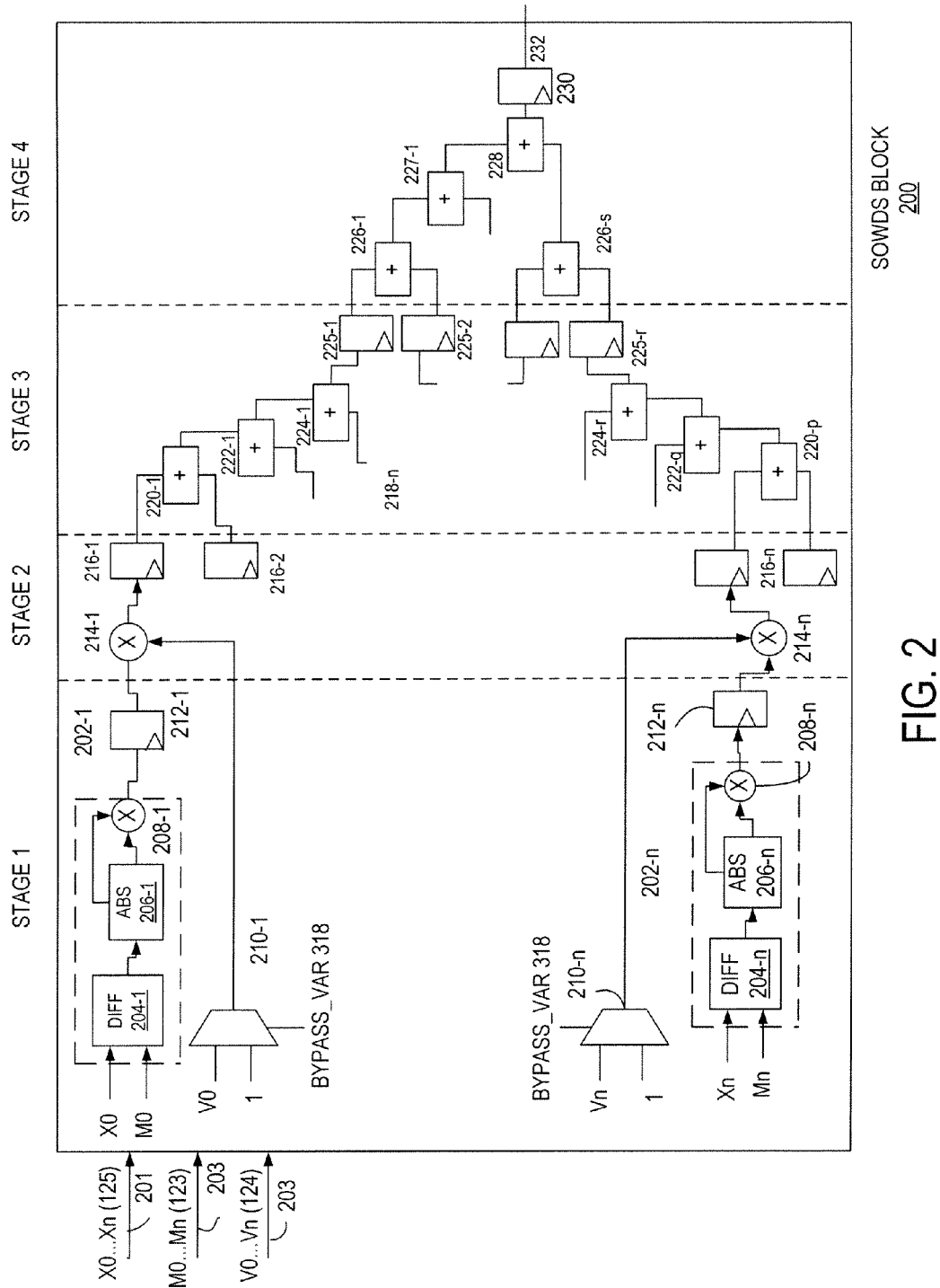
FIG. 2 illustrates logic to support speech recognition algorithms in conjunction with at least one embodiment.

Referring now to FIG. 2, an embodiment of SOWDS logic 200 of GMM scoring logic 130 is illustrated. The FIG. 2 embodiment of SOWDS logic 200 includes an input 201 to receive a feature vector X 125 extracted by the front end 120 block, and inputs 203 and 204 to access or receive a vector, referred to herein as a mixture vector, corresponding to a component of a Gaussian mixture model. In the FIG. 2 embodiment, a mixture vector is represented by the combination of a mean vector M 123 and a variance vector V 124. In the FIG. 2 embodiment, feature vector X 125, mean vector M 123, and variance vector V 124 are all vectors having n elements. In some embodiments, all n elements of variance vector V 124 may have the same value.

The FIG. 2 embodiment of SOWDS logic 200 includes resources to receive the n elements of feature vector X 125 and mean vector M 123 in parallel and includes a 5-stage pipeline for performing sum-of-weighted-differences-squared values in a pair-wise fashion until a final weighted sum of differences squared value is produced by adder circuit 228. In theory, feature vector 125 may include any number of vector elements, but based on known algorithms, a feature vector having 128 elements or less is typical, with 24 to 96 vector elements being common. If the number of vector elements exceeds the number of vector component inputs that SOWDS logic 200 can accommodate, SOWDS logic 200 may require multiple clock cycles to receive an entire feature vector and a corresponding mixture vector. If, for example, input 201 of SOWDS logic 200 includes 48 vector component inputs and feature vector X 125 has less than 48 elements, an entire feature vector X 125 and an entire corresponding mixture vector including mean vector M 123 and variance vector V 124 can be received in each clock cycle. If the number of feature vector elements is greater than 48, two or more cycles would be necessary to receive the entire feature vector and its corresponding mixture vector. For the FIG. 2 embodiment, assuming n is less than or equal to 48, the depicted implementation of SOWDS logic 200 illustrates the computation or generation of a final sum 232 in five clock cycles and the generation of one subsequent final sum value every clock cycle thereafter.

The FIG. 2 embodiment of SOWDS logic 200 includes n instances of sum-of-differences-squared (SODS) logic 202 in stage 1 of the pipeline, demarcated by the first stage latches 212, to compute n SODS values for the n elements of feature vector X 125 and the corresponding n elements of mean vector M 124, i.e., $(x_i - m_i)^2$ for i=1 to n. In the FIG. 2 embodiment, each instance of SODS logic 202 includes a difference circuit 204 that computes the difference between a feature vector element and a corresponding element of the mean vector, an absolute value circuit 206, a multiplier 208, and a latch 212. In some embodiments, the absolute value circuit 206 may be omitted.

In the FIG. 2 embodiment of stage 2, the SODS value from first stage latch 212 is multiplied by the output from multiplexer 210 in multiplier 214 and provided to the SOWDS value to stage 2 latch, 216. Depending upon an value of a variance bypass input parameter (BYPASS_VAR) 318, multiplexer 210 provides either the applicable element of variance vector V 124 or a value of 1, i.e., no weighting, to multiplier 214. The outputs of adjacent pairs of second stages latches, e.g., latches 216-1 and 216-2 are then summed by adders 220, e.g., adder 220-1. The outputs of adjacent pairs of adders 220 (only one adder 220-1 of the pair is shown) are then summed by adders 222, e.g., adder 222-1. The outputs of adjacent pairs of adders 222 are then summed in adders 224 and the outputs of adders 224 are provided to respective stage 3 latches 225. In stage 4, outputs of adjacent pairs stage 3 latches 225 are summed in adders 226 and the outputs of adjacent pairs of adders 226 are summed in adders 227. In the FIG. 3 embodiment, only one adder 227 is needed because there is only one adjacent pair of adders 226. In the FIG. 3 embodiment, the output of adder 227-1 is added to the output of the unpaired adder 226-s in adder 228 and the output of adder 228 is provided to stage 5 latch 230. The output of stage 5 latch 230, which is the output from SOWDS logic 200, is FINAL_SUM 232. While FIG. 2 depicts SOWDS logic as being implemented in 5 pipelines stages, the number of stages is an implementation detail influenced by the number of input components, i.e., the number of elements in a feature vector X 125, as well as the speed of the logic elements. For example, FIG. 2 represents stage 3 and stage 4 as being able to complete three consecutive summations in a single clock cycle, but other embodiments may be capable of more or less than three consecutive summations per clock cycle and the number of stages required may change accordingly.

A Gaussian mixture model typically includes multiple mixtures and each mixture is characterized by a mean and a variance. SOWDS logic 200 generates a final sum 232 for each mixture. If, for example, a Gaussian mixture model includes 6 Gaussian mixtures and the number of elements in feature vector X 125 permits receiving an entire feature vector per clock cycle, SOWDS logic 200 will generate 6 final sum values 232 when for each feature vector 125 is provided. Qualitatively, each final sum 232 represents a probabilistic similarity between the feature vector X 125 and the applicable Gaussian mixture.

Figure 3:
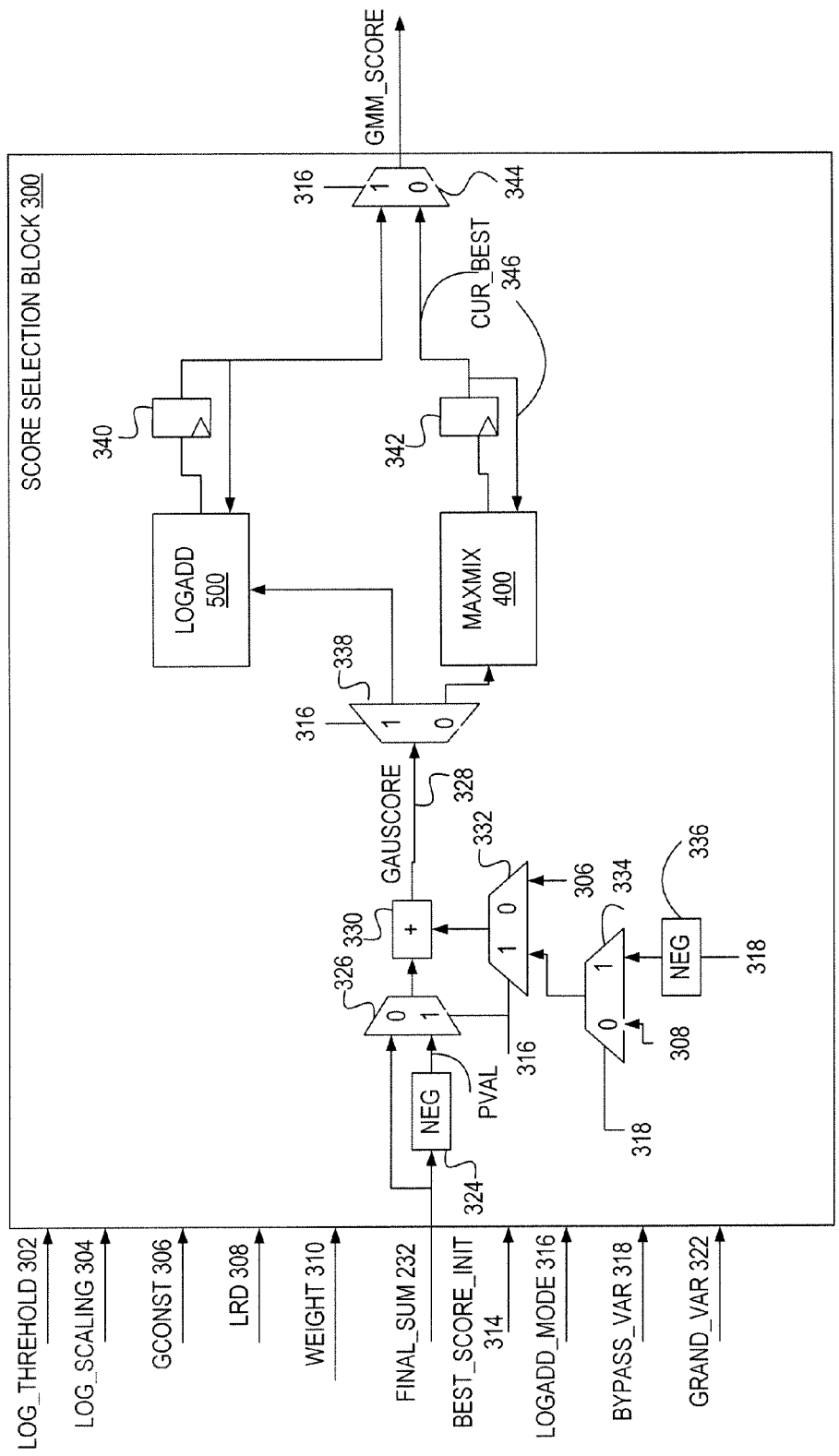
FIG. 3 illustrates a scoring selection architecture to support speech recognition algorithms in conjunction with at least one embodiment.

Referring now to FIG. 3, an embodiment of the score selection logic 300 of FIG. 1 is depicted. A variety of algorithms are used in conjunction with generating GMM scores for observed objects and the different algorithms may generated significantly different results for the same input. The FIG. 3 embodiment beneficially employs a flexible architecture to provide hardware-based support for a variety of different algorithms including algorithms that employ a logarithmic summation of the final sum values and algorithms that employ a maximum/minimum selection.

In the FIG. 3 embodiment, score selection logic 300 receives or obtains values for a number of input parameters that define the algorithm to be used. The score selection logic 300 determines GMM score 135 from the sets of final sum values 232 generated by SOWDS logic 200. In the FIG. 3 embodiment of score section logic 300, the inputs include, but are not limited to, LOG_THRESHOLD 302, LOG_SCALING 304, GCONST 306, LRD 308, WEIGHT 310, FINAL_SUM 232, BEST_SCORE_INIT 314, LOGADD_MODE 316, BYPASS_VAR 318 and GRAND_VAR 320.

By using some of these input parameters as control signals for multiplexer circuits, the FIG. 3 embodiment of score selection logic 300 determines a GMM score based on either a logarithmic summation technique represented by logarithmic summation logic 500 and a MAXMIX logic 400. The LOGADD_MODE input 316, for example, provides the control function for a number of multiplexers including multiplexers 326, 332, 338, and 344, while the variance bypass parameter BYPASS_VAR 318 provides input to multiplexer 334 and multiplexers 210 (FIG. 2).

In the FIG. 3 embodiment, an intermediate value, labeled in FIG. 3 as GAUSCORE 328 is generated based on the final sum 232 from SOWDS logic 200 and either an LRD parameter 308 or a GCONST input 306 depending upon the algorithm in use. GAUSCORE 328 is provided either to a logarithmic summation logic identified as logarithmic summation logic 500 or maximum minimum logic identified as MAXMIX logic 400. The outputs of logarithmic summation logic 500 and MAXMIX logic 400 are latched in latches 340 and 324 and thereafter provided to multiplexer 344, which selects one of the two values based on the values of LOGADD_MODE parameter 316.

Figure 4:
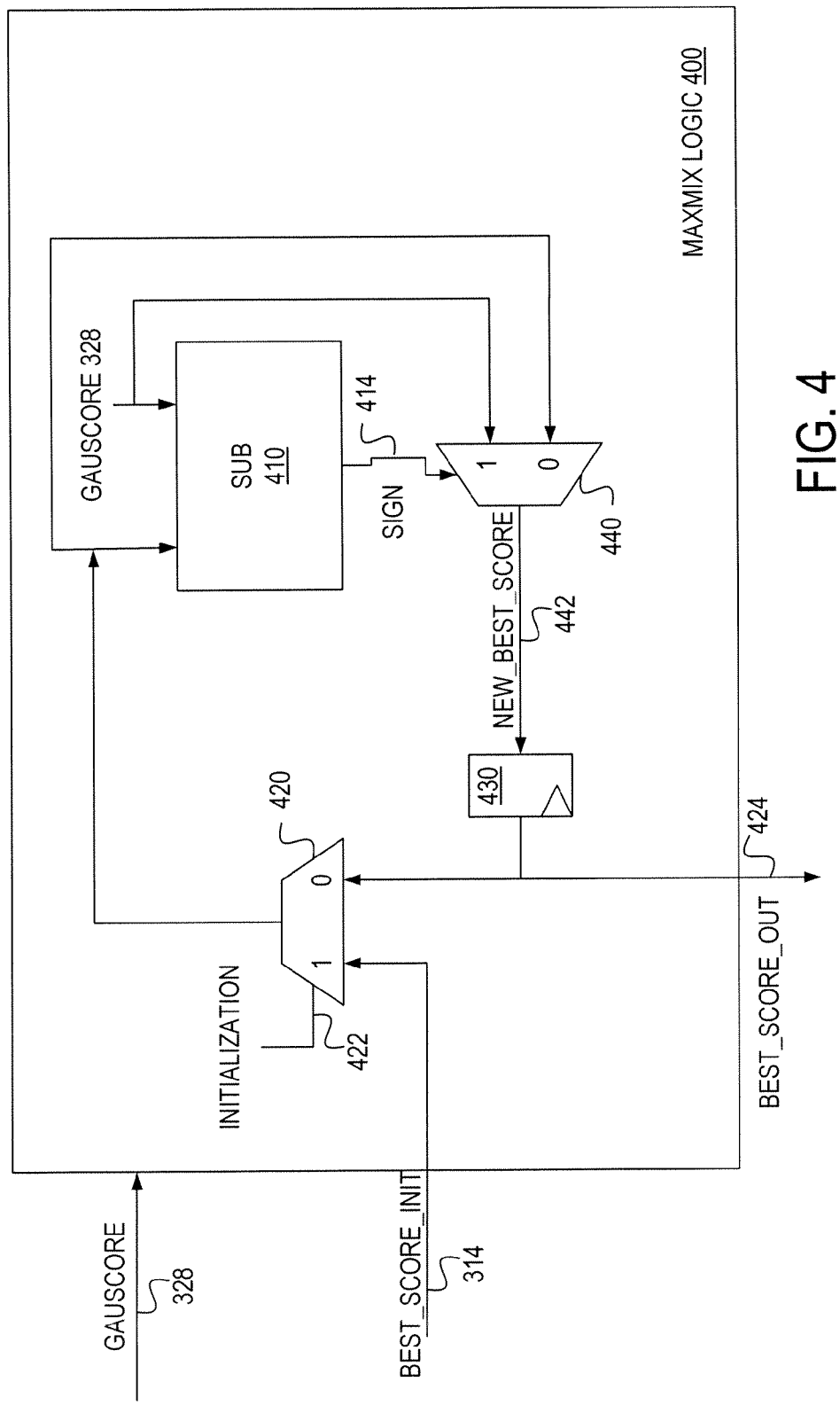
FIG. 4 illustrates a score selection block in conjunction with at least one embodiment.

Referring now to FIG. 4, an embodiment of a MAXMIX score selection logic 400 is depicted. The FIG. 4 embodiment of MAXMIX logic 400 includes receives GAUSCORE 328 (FIG. 3) and an initial value (BEST_SCORE_INIT). Subtraction logic 410 generates a control input (SIGN 414) for multiplexer 440, which selects between the current maximum and the current value of GAUSCORE 328 as the NEW_BEST_SCORE 442. This process is performed recursively for each final sum produced in SOWDS block 200 (FIG. 2), resulting in a final value of NEW_BEST_SCORE 442, which becomes the GMM Score 135 depending on the variance bypass signal.

Figure 5:
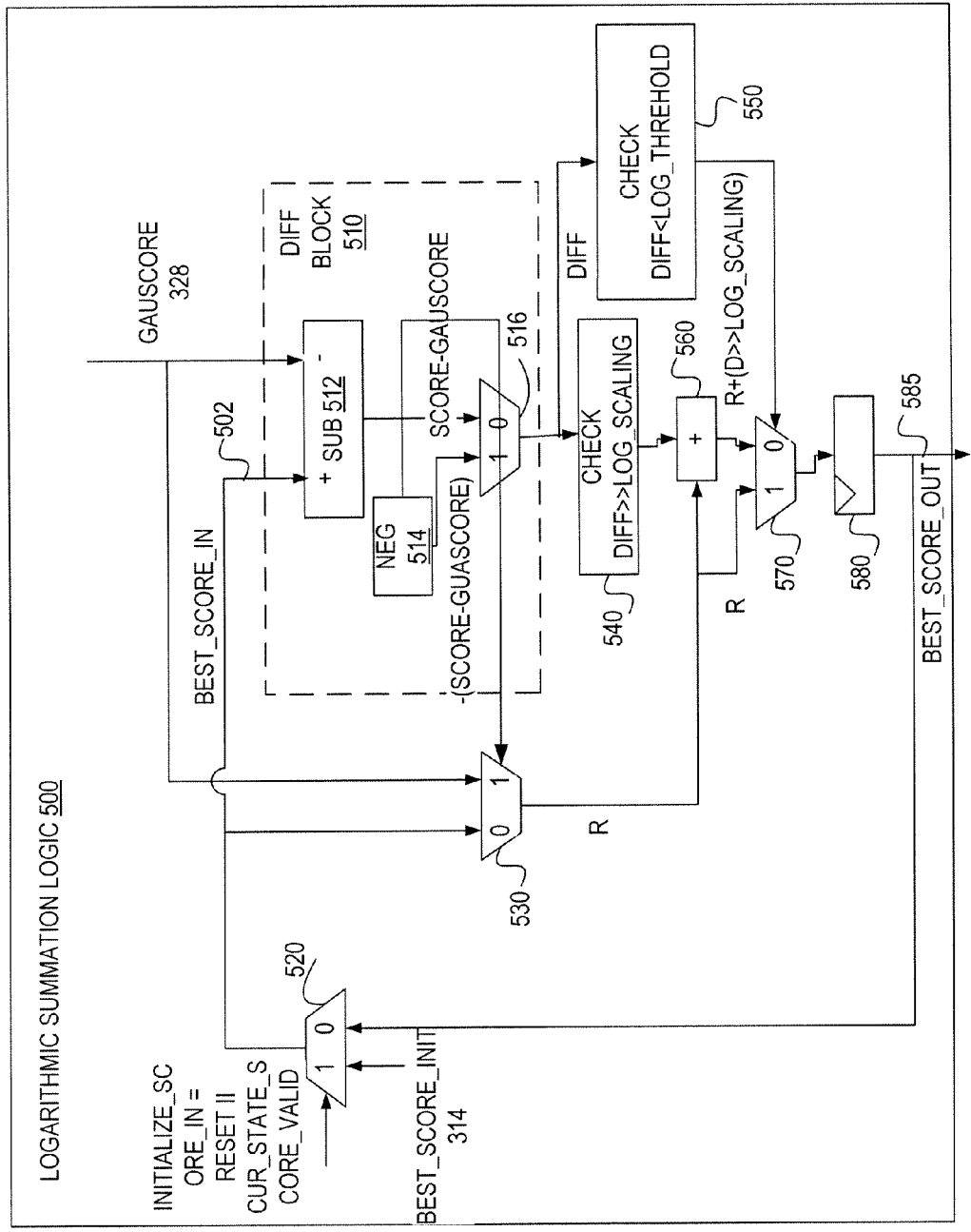
FIG. 5 illustrates a flexible log-add approximation logic in conjunction with at least one embodiment.

Referring now to FIG. 5, an embodiment of logarithmic summation logic 500 is depicted. The operation performed in logarithmic summation logic 500 represents a summation of an average and a correction factor, composed of a constant and a term based on a difference between the input arguments. In the FIG. 5 embodiment, GAUSCORE 328 (from FIG. 3) is provided to difference block 510 to compute a difference between GAUSCORE 328 and BEST_SCORE_IN 502. BEST_SCORE_IN 502 is selected by multiplexer 520 from BEST_SCORE_INIT 314 and BEST_SCORE_OUT 585.

In flexible log-add approximation block 500, block 540 checks to determine if the difference, found in block 510, is greater than LOG_SCALING 304, while block 550 checks to determine if the difference is less than LOG_THRESHOLD 302. The output of block 550 is provides a control input to multiplexer 570 which selects between two values as BEST_SCORE_OUT 585.

Figure 6:
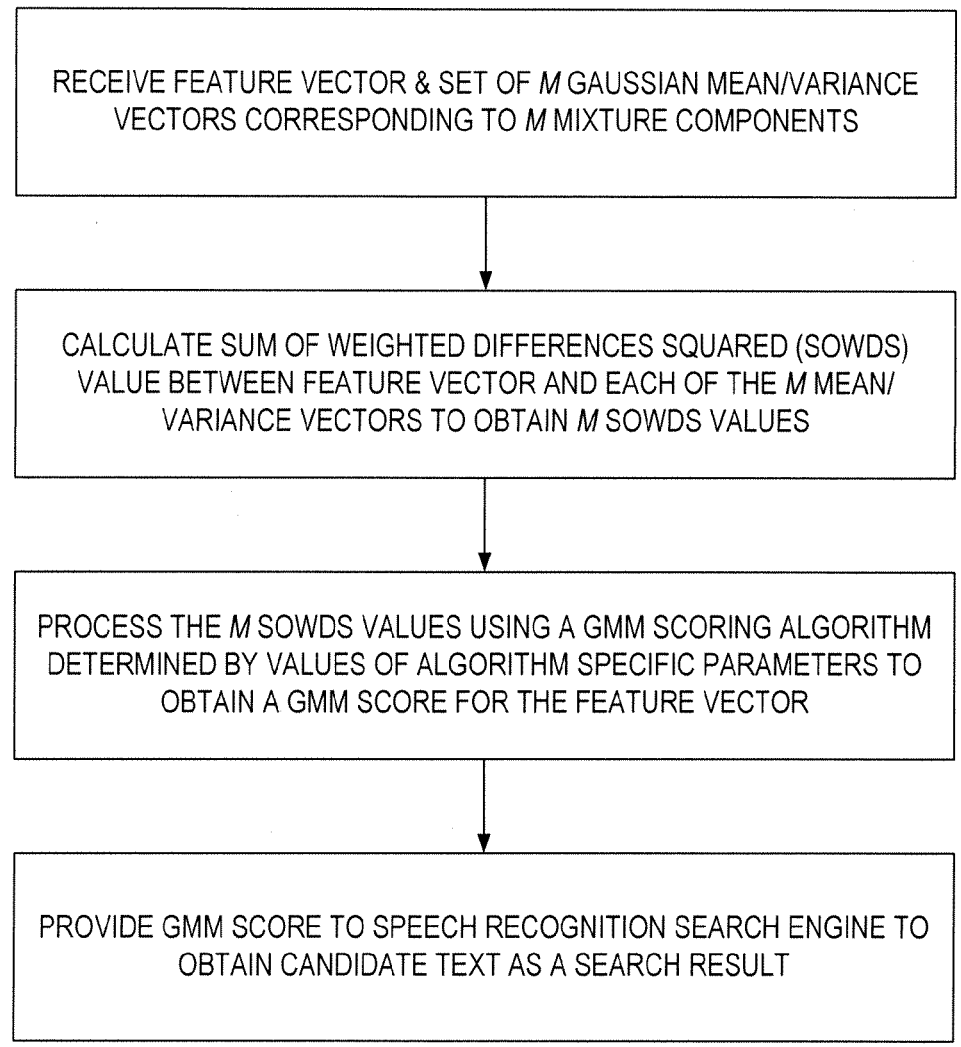
FIG. 6 illustrates one embodiment of a method for a flexible and programmable Gaussian mixture model scoring architecture.

Referring now to FIG. 6, a flow diagram illustrates an embodiment of a speech processing method 600. Method 600 may represent operations performed by a processor executing a sequence of processor executable program instructions. The instructions may be stored in a computer readable storage medium. Although shown in a particular sequence or order, unless otherwise stated, the order of actions can be modified. FIG. 6 is a flow diagram illustrating a method for a flexible and programmable Gaussian mixture model scoring architecture used in speech recognition system In the FIG. 6 embodiment, a feature vector X and a set of M Gaussian mixture mean vectors M and variance vectors V are received (operation 610) by GMM scoring logic 130. A sum of weighted differences squared computation is then performed (operation 620) by SOWDS logic 200 to calculate a set of M final sums 232 (one for each mixture). The M final sums are then processed (operation 630) using a GMM scoring algorithm determined by values of algorithm specific parameters to obtain a GMM score 135 corresponding to the feature vector 125. The GMM score is then provided (block 640) to a speech recognition search engine to obtain a text corresponding to the GMM score as a search result.

If parameters supplied to score selection logic indicate an algorithm that employs MAXMIX, then the flow proceeds to process block 650 and a MAXMIX computation is performed. In the parameters indicate a logarithmic summation approximation, the appropriate computation is performed.

Figure 7:
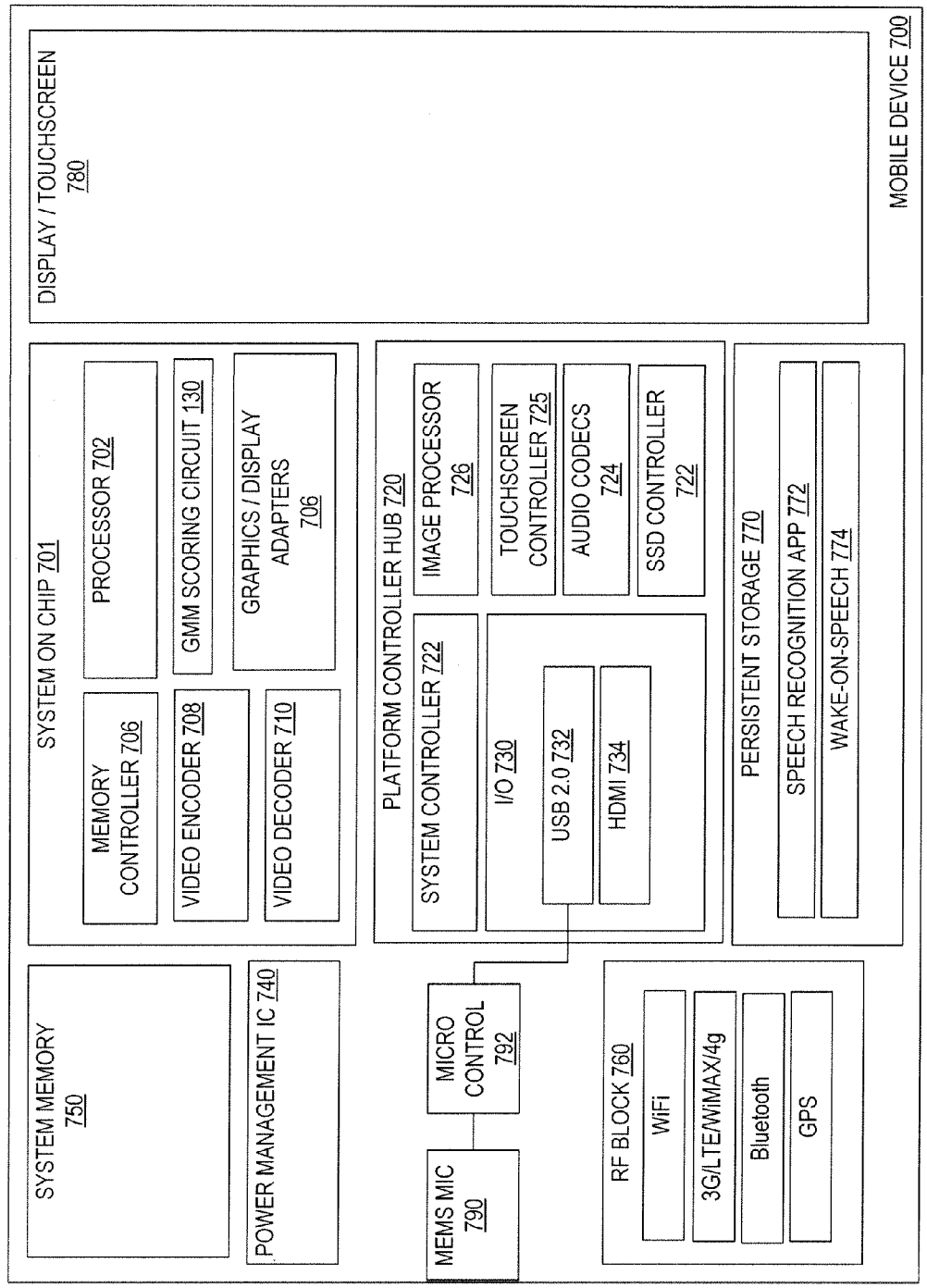
FIG. 7 illustrates a mobile device platform used in conjunction with at least one embodiment.

The GMM scoring logic 130 may be implemented in various types of systems and platforms including a mobile device platform that might include a tablet device and/or a smartphone device. Referring now to FIG. 7, a block diagram of selected elements of at least one embodiment of a mobile device 700 employing GMM scoring logic 130 as described herein is depicted. The FIG. 7 embodiment of mobile device 700 features a processing core implemented in a System on Chip device, a system controller implemented on a processing hub, and integrated power management and radio frequency functions. The FIG. 7 embodiment of mobile device 700 is representative of a mobile device suitable for incorporating a GMM scoring engine 130 as described above. However, it will be apparent to one skilled in the art that other embodiments may include more, less, or different hardware and software elements illustrated in FIG. 7.

In the FIG. 7 embodiment, mobile device 700 includes a system on chip device 701, a platform controller hub 720, and a radio frequency integrated circuit 730. The system on chip device 701 includes a processor 702, and integrated features including a graphics/display adapter 704, a memory controller 706, a video encoder 708, and a video decoder 710. The platform controller hub 720 includes a system controller 722, and various features I/O interfaces including an image processor 726 suitable for use with a digital camera (not depicted), a touchscreen controller 725, audio codecs 724, and a general purpose I/O block 730. In the FIG. 7 embodiments, I/O block 730 includes a USB controller 732 and an HDMI controller 734. An SSD controller 722 is operable to interface with persistent storage 770. The FIG. 7 embodiment SOC 700 depicted in FIG. 7 further includes a display/touchscreen element 780, and system memory 750.

A power management integrated circuit 740 interfaces with processor 702 and system controller 722 to reduce power consumption in mobile device 700.

Radio frequency integrated circuits 730 as depicted include support for various wireless interfaces including a Wi-Fi interface 732 and one or more cellular interfaces 734 that provide support for various wireless cellular interfaces including, as examples, 3G, LTE, WiMAX, and 4G. Radio frequency integrated circuit 730 as shown further includes Bluetooth support 736 and a global positioning system (GPS) capable receiver 738.

The FIG. 7 embodiment of processor 702 may include dedicated L1 instruction and data caches, a shared L2 cache, and dual instances of function-centric execution clusters to support execution of two threads. In at least one embodiment suitable for mobile and other battery based platforms, processor 702 may include any one or more of a number of power conservation features.

The FIG. 7 embodiment of device 700 supports a wake-on-speech feature that employs a microcontroller 792 connected to a microphone represented in FIG. 7 by a micro electrical mechanical (MEMs) microphone 790. MEMs microphone 790 is connected, in the depicted embodiment, to microcontroller 792 via a serial bus. In the FIG. 7 embodiment, the serial bus is a USB bus supported by USB host controller 732.

Microcontroller 792 may be implemented as a configurable/extensible core that uses a subset of a more general purpose instruction set (e.g., a subset of an x86 instruction set). The core of microcontroller 792, in one embodiment, can be customized with new instructions for accelerating a target workload since it is flexible. Microcontroller 792 may be configured for efficient operation that can be used in ultra-low power devices and system-on-chip subsystems.

In at least one embodiment, microcontroller 792 executes a stored program, identified in FIG. 7 as wake-on-speech application 774. Embodiments of wake-on-speech application 774 group audio samples from MEMs microphone 790 into overlapping blocks and performs feature extraction on them. Microcontroller 792 may then store data indicative of extracted feature vectors in system memory 750 or another data store resource. Microcontroller 792 may then invoke GMM scoring circuit 130 by, for example, accessing control registers to initiate GMM scoring. GMM scoring circuit 130 may then calculate scores for a speech model and a background model and store the scores to a suitable storage medium. In some embodiments, GMM scoring circuit 130 notifies microcontroller 792 that the scoring is complete. Microcontroller 792 may then compare scores to a threshold and declares the audio to be speech or non-speech. Microcontroller 792 may then then write the result to a GPIO pin (not depicted) used to wake a DSP (not depicted) for further analysis of the voice signal. In this manner, the combination of MEMs microphone 790, microcontroller 792, and wake on speech application program 774, provide a low power discrete system to perform wake up-on-speech activity.

Figure 8:
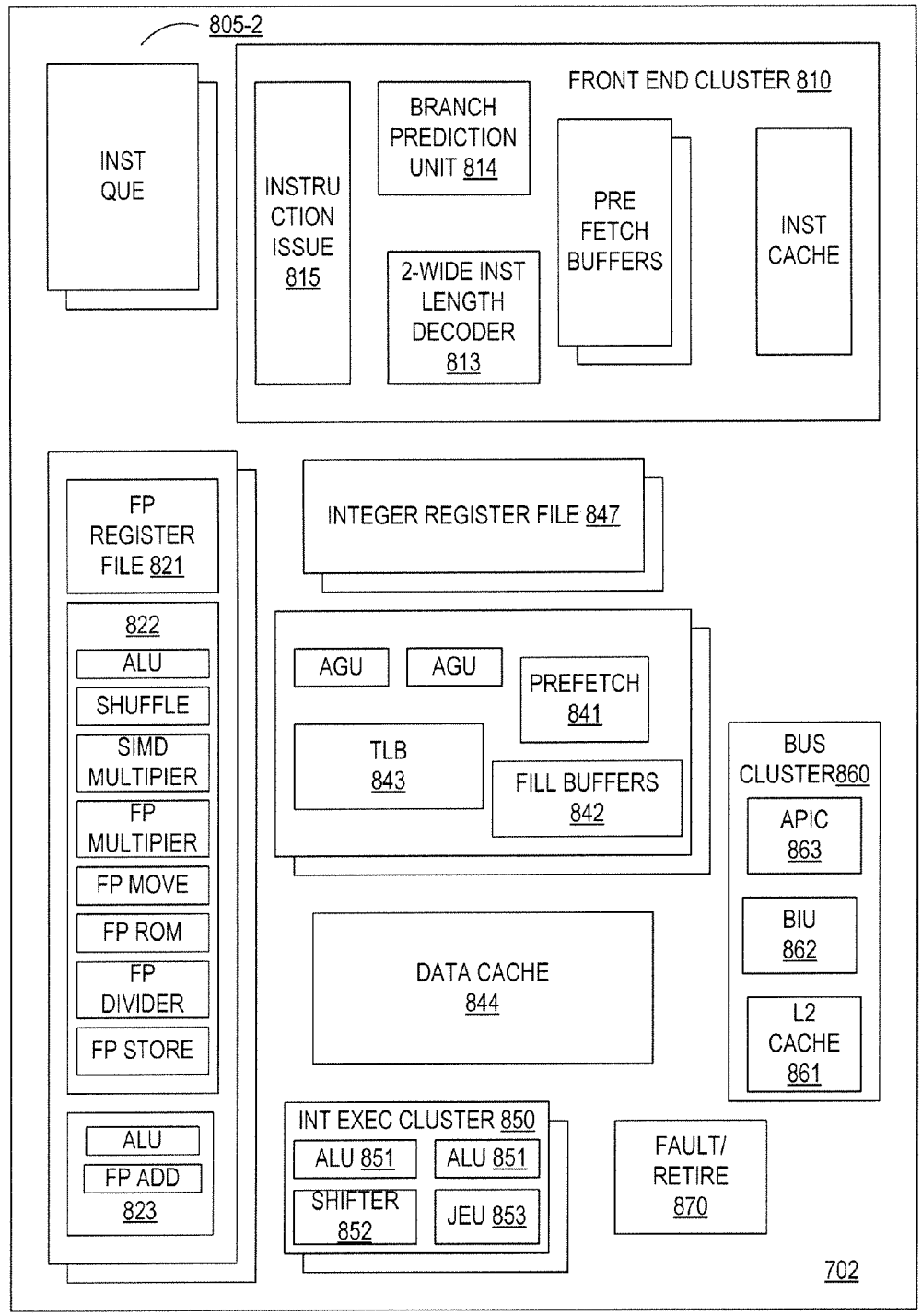
FIG. 8 illustrates a system on chip processor used in conjunction with at least one embodiment.

Referring now to FIG. 8, an embodiment of a processor architecture suitable for the mobile device platform 700 of FIG. 7 includes a front end cluster 810 to fetch, decode, and issue instructions to the execution clusters. The FIG. 8 embodiment of front end cluster 810 includes an instruction cache 811 that receives an address generated by branch prediction unit 814 and outputs instruction code to prefetch buffers 812-1 and 812-2. Each prefetch buffer 812 feeds an instruction length decoder 813 that support a variable length instruction architecture. A microcoding unit 815 translates the architected instructions into microcode instructions executable in the execution clusters.

Microcoded instructions generated by microcoding unit 815 are provided to per-thread instances of instruction issue queues 805. A front end cluster 810 communicates with issue queues 805 over dual channels 817 that support two instructions issued per cycle. In at least one low-power embodiment, processor 702 is an in-order processor in which instructions are issued and executed in program order. In-order instruction execution beneficially eliminates the requirement for relatively complex and power consuming circuitry needed to support out-of-order execution.

The execution clusters of the FIG. 8 embodiment of processor 702 include a complex execution cluster 820, an integer execution cluster 850, and a memory access cluster 840. In at least one embodiment, front end cluster 810 generates two instructions per cycle and provides the issued instructions to one of the instruction queues 805. In embodiments that include at least some power awareness, complex execution cluster 820 employs a power aware design in which special purpose execution units are leveraged to process simpler instructions. The FIG. 8 embodiment of processor 702 may employ, for example its SIMD integer multiplier to execute instructions that would require otherwise require a dedicated scalar integer multiplier or employ its floating point multiplier to execute instructions that would otherwise require a dedicated integer divider.

The FIG. 8 embodiment of complex execution cluster 820 includes a floating-point register file 821, a complex instruction unit 822, and a floating-point adder 822. The complex instruction unit 822 depicted in FIG. 8 that includes a floating-point multiplier, a floating-point divider, a floating-point store unit and a single instruction multiple data (SIMD) multiplier as well as a integer ALU to support operation of the complex execution units. Similarly, floating pointer adder The FIG. 8 embodiment of floating-point unit 822 also includes a single instruction multiple data (SIMD) multiplier to support common graphics and multimedia operations.

An integer register file 847 communicates with address generation units (AGUs) 845 and 846 in memory access cluster 840. Addresses generated by AGUs 845 are routed to dual ported tag array in data cache 844, which exchanges data with integer execution cluster 850. communicates to an integer execution cluster 850. The FIG. 8 embodiment of data cache 844 is supported by a data prefetcher 841, a translation lookaside buffer 843 to translate virtual or linear addresses to physical address for presentation to a tag array (not expressly depicted) of data cache 844, and a fill buffer 842 that buffers in-flight cache line fills via a bus cluster 860. The depicted embodiment of bus cluster 850 includes an L2 cache 861, a bus interface unit 862, and an advanced program programmable interrupt controller 863. Bus interface unit 862 as depicted in FIG. 8 communicates with a front side bus 890 suitable for interfacing with an appropriate I/O chipset device.

For example, at least one embodiment of processor 702 is implemented as an in-order processor which instructions are issued and executed substantially in program order. Some embodiments, may support inter-threaded execution in which front end cluster opts to provide two instructions from the same thread in a single cycle, but issue and execution is otherwise in-order.

Figure 9:
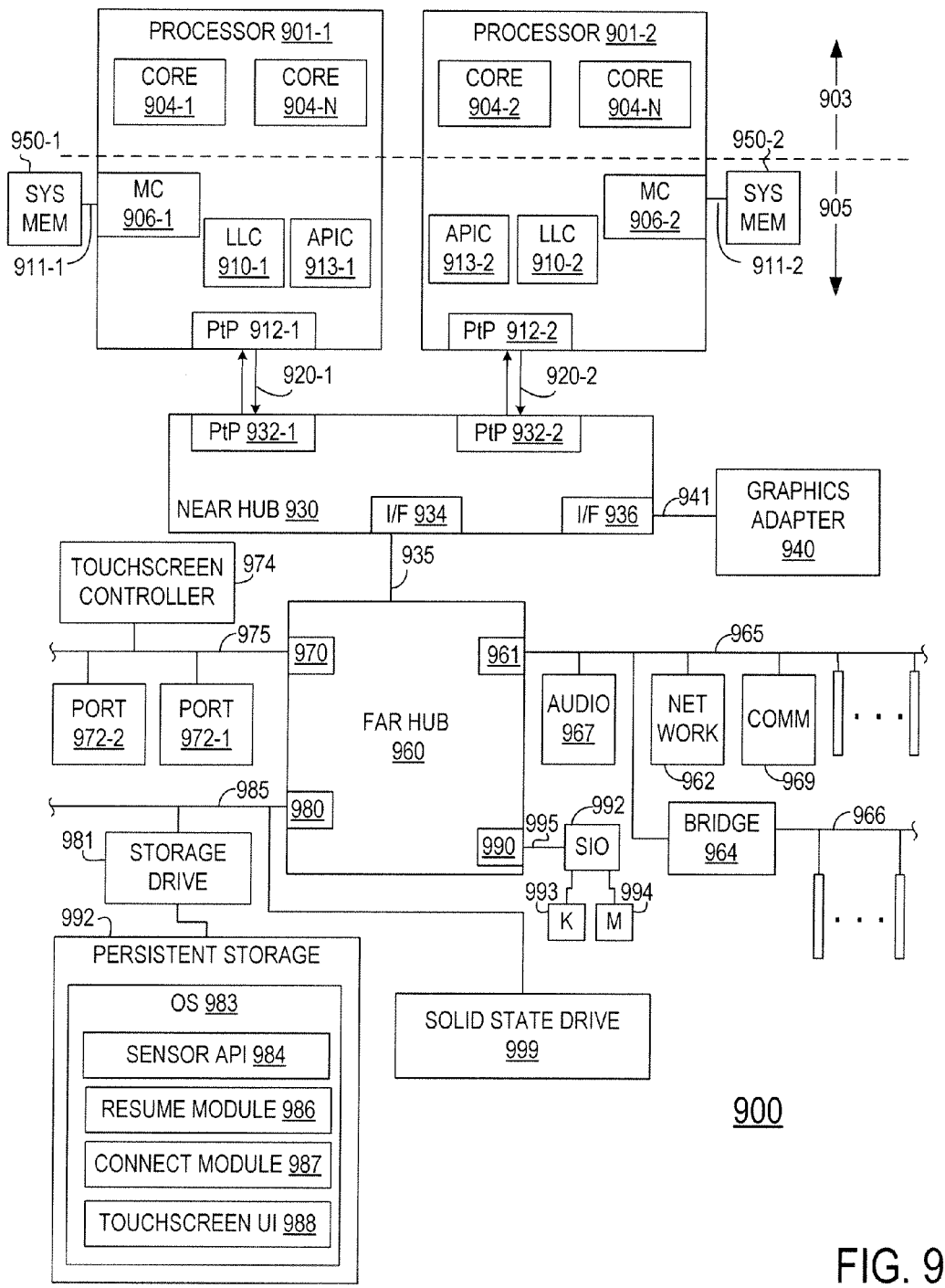
FIG. 9 illustrates a multiprocessor platform used in conjunction with at least one embodiment.

While FIG. 7 and FIG. 8 emphasize a mobile device platform, FIG. 9 depicts elements of a platform for a multiprocessor system 900. The FIG. 9 embodiment of system 900 includes a first processor 901-1, a second processor 901-2, and an I/O hub referred to herein as near hub 930. Near hub 930 communicates with processor 901-1 over a point-to-point interconnect 920-1 connected between a point-to-point interface 932-1 of near hub 930 and a point-to-point interface 912-1 of processor 901-1. Similarly, near hub 930 communicates with processor 901-2 via point-to-point interconnect 920-2 between point-to-point interface 932-2 of near hub 930 and point-to-point interface 912-2 of processor 901-2. In the FIG. 3 embodiment, near hub 930 also includes a graphics interface 936 to communicate with a graphics adapter 940 over a dedicated graphics bus 941, which may be a PCI Express or other suitable type of interconnection. Multiprocessor system 900 may further include a point-to-point interconnect (not depicted) between processor 901-1 and processor 901-2. The point-to-point interconnects 920 depicted in FIG. 9 include a pair of uni-directional interconnections with one of the interconnects communicating data from the applicable processor 901 to near hub 930 and the other interconnection communicating data from near hub 930 to the processor 901.

The FIG. 9 processors 901 may be described as including a core portion 903 and an uncore portion 905. The core portions 903 of the FIG. 9 processors 901 include multiple processor cores, referred to herein simply as cores 904-1 through 904-n. Each core 904 may include logic implemented in hardware, firmware, or a combination thereof that provides, as examples, an execution pipeline suitable for fetching, interpreting, and executing instructions and storing or otherwise processing results of those instructions. Uncore portions 905 of the FIG. 9 processors 901 may include a system memory controller (MC) 906, a cache memory referred to herein as the last level cache 910, and an interrupt controller 913. Each system memory interface 906 may perform various memory controller functions. Last level cache 910 may be shared among each of the cores 904 of processor 901. Interrupt controller 913 may include features of conventional interrupt controllers to manage and prioritize interrupts.

The FIG. 9 multiprocessor system 900 employs a distributed or non-uniform system memory architecture in which the system memory as a whole is implemented as a plurality of system memory portions 950 with each system memory portion 950 being directly connected to a processor 901 via a corresponding memory interconnect 911 and system memory interface 906. In this distributed memory configuration, each processor 901 may interface directly with its corresponding system memory portion 950 via its local system memory interface 906. In addition, any processor, e.g., processor 901-1, may read from or write to a memory portion, e.g., system memory portion 950-2 associated with a different processor, e.g., processor 901-2, but the originating processing may need to go through one or more point-to-point interfaces 920 to do so. Similarly, the last level cache 910 of each processor 901 may cache data from its own processor's system memory portion 950 or from another processor's system memory portion.

Although FIG. 9 depicts a distributed memory configuration, other embodiments may employ a uniform memory architecture in which, for example, the entire system memory is connected to a memory controller implemented in near hub 930 rather than having multiple system memory portion 950, each connected to a corresponding processor-specific memory controller 906 implemented in the uncores 905 of each processor 901. Such a system is described below with respect to FIG. 4. Moreover, although FIG. 9 depicts a point-to-point configuration in which processors 901 communicate with each other and with near hub 930 via dedicated point to point interconnections 920, other embodiments may employ a shared system bus to which each of the processors 901 and near hub 930 is connected.

In the FIG. 9 embodiment of system 900, near hub 930 includes an I/O interface 934 to communicate with a far hub 960 over an I/O interconnection 935. Far hub 960 may integrate, within a single device, adapters, controllers, and ports for various interconnection protocols to support different types of I/O devices. The depicted implementation of far hub 960 includes, as an example, an expansion bus controller 961 that supports an expansion bus 965 that complies with PCI, PCI Express, or another suitable bus protocol. Examples of functions that may be provided via expansion bus 965 include a network adapter 962, an audio controller 967, and a communications adapter 969. Network adapter 962 may enable communication with an IEEE 902.11 family or other type of wireless data network, a Gigabit Ethernet or other type of wire line data network, or both. Audio controller 967 may include or support high definition audio codecs. Communications adapter 969 may include or support modems and/or transceivers to provide wireless or wire line telephony capability. Bus controller 961 may further recognize a bus bridge 964 that supports an additional expansion bus 966 where expansion bus 966 and expansion bus 965 have the same protocol or different protocols. Far hub 960 may further include a high bandwidth serial bus controller 970 that provides one or more ports 972 of a Universal Serial Bus (USB) or other suitable high bandwidth serial bus 975.

The FIG. 9 far hub 960 further includes a storage adapter 980 that supports a persistent storage interconnect 985 such as an Integrated Drive Electronics (IDE) interconnect, a Serial ATA interconnect, a SCSI interconnect, or another suitable storage interconnect to a storage drive 981 that controls persistent storage 982. Far hub 960 may further include a Low Pin Count (LPC) controller 990 that provides an LPC bus 995 to connect low bandwidth I/O devices including, as examples, a keyboard 993, a mouse 994, a parallel printer port (not depicted), and an RS232 serial port (not depicted). Multiprocessor system 900 as depicted in FIG. 9 employs a Super I/O chip 992 to interface keyboard 993 and mouse 994 with LPC controller 990.

In at least one embodiment, the emulated speech processing functionality described herein is suitable employed in a system that includes some or all of various system features. The FIG. 9 embodiment of system 900 emphasizes a computer system that incorporates various features that facilitate handheld or tablet type of operation and other features that facilitate laptop or desktop operation. In addition, the FIG. 9 embodiment of system 900 includes features that cooperate to aggressively conserve power while simultaneously reducing latency associated with traditional power conservation states.

The FIG. 9 embodiment of system 900 includes an operating system 983 that may be entirely or partially stored in a persistent storage 982. Operating system 983 may include various modules, application programming interfaces, and the like that expose to varying degrees various hardware and software features of system 900. The FIG. 9 embodiment of system 900 includes, for example, a sensor application programming interface (API) 984, a resume module 986, a connect module 987, and a touchscreen user interface 988. System 900 as depicted in FIG. 1 may further include various hardware/firm features include a capacitive or resistive touch screen controller 974 and a second source of persistent storage such as a solid state drive 989.

Sensor API 984 provides application program access to one or more sensors (not depicted) that may be include in system 900. Examples of sensors that system 900 might have include, as examples, an accelerometer, a global positioning system (GPS) device, a gyrometer, an inclinometer, and a light sensor. The resume module 986 may be implemented as software that, when executed, performs operations for reducing latency when transition system 900 from a power conservation state to an operating state. Resume module 986 may work in conjunction with the solid state drive (SSD) 989 to reduce the amount of SSD storage required when system 900 enters a power conservation mode. Resume module 986 may, for example, flush standby and temporary memory pages before transitioning to a sleep mode. By reducing the amount of system memory space that system 900 is required to preserve upon entering a low power state, resume module 986 beneficially reduces the amount of time required to perform the transition from the low power state to an operating state. The connect module 987 may include software instructions that, when executed, perform complementary functions for conserving power while reducing the amount of latency or delay associated with traditional "wake up" sequences. For example, connect module 987 may periodically update certain "dynamic" applications including, as examples, email and social network applications, so that, when system 900 wakes from a low power mode, the applications that are often most likely to require refreshing are up to date. The touchscreen user interface 988 supports a touchscreen controller 974 that enables user input via touchscreens traditionally reserved for handheld applications. In the FIG. 1 embodiment, the inclusion of touchscreen support in conjunction with support for keyboard 993 mouse 994 and the enable system 900 to provide features traditionally found in dedicated tablet devices as well as features found in dedicated laptop and desktop type systems.

Figure 10:
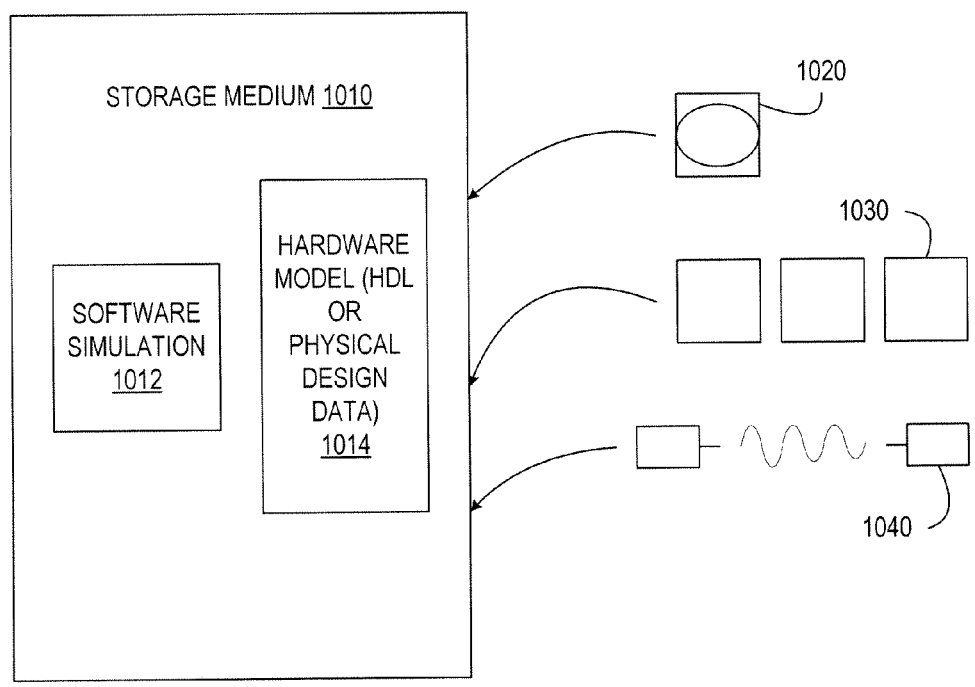
FIG. 10 illustrates a representation for simulation, emulation, and fabrication of a design implementing the disclosed techniques.

Referring now to FIG. 10, a representation for simulation, emulation and fabrication of a design implementing the disclosed techniques. Data representing a design may represent the design in a number of manners. First, as is useful in simulations, the hardware may be represented using a hardware description language or another functional description language which essentially provides a computerized model of how the designed hardware is expected to perform. The hardware model 1014 may be stored in a storage medium 1010 such as a computer memory so that the model may be simulated using simulation software 1012 that applies a particular test suite to the hardware model 1014 to determine if it indeed functions as intended. In at least one embodiment, the simulation software 1012 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. An optical or electrical wave 1040 modulated or otherwise generated to transmit such information, a memory 1030, or a magnetic or optical storage 1020 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor, comprising:
   a microcontroller to execute a speech application and including a core to perform feature extraction of speech input of a user to generate a feature vector;
   a hardware logic coupled to the core comprising:
   an input to receive the feature vector indicative of a portion of the speech input;
   a Gaussian mixture model (GMM) hardware circuit including a score generator logic to be invoked by the microcontroller to receive the feature vector, model any of a plurality of GMM speech recognition algorithms, and generate a GMM score for the feature vector based on the GMM speech recognition algorithm modeled, wherein the GMM speech recognition algorithm includes a plurality of mixture components and the GMM hardware circuit is operable to generate feature vector scores corresponding to each of the plurality of mixture components, the feature vector scores based on:
   a first stage including a plurality of first logic to compute a sum of difference squared value for an element of the feature vector;
   a second stage including a plurality of multipliers to compute a sum of weighted difference value for an element of the feature vector;
   and a plurality of stages to perform pair-wise summations of adjacent values output by the second stage to generate a feature vector sum indicative of a weighted sum of differences squared between the feature vector and a mixture component of the GMM speech recognition algorithm; and
   a score selection block to:
   receive the feature vector scores and algorithm inputs, wherein the algorithm inputs comprise a logarithmic mode input, including a first value indicative of the modeled GMM speech recognition algorithm to implement a logarithmic summation calculation to determine the GMM score, and further including a second value indicative of the modeled GMM speech recognition algorithm to implement a recursive selection between a current GMM score and an intermediate value based on the feature vector sum;

implement the modeled GMM speech recognition algorithm based on the algorithm inputs; and generate the GMM score for the modeled speech recognition algorithm based on the feature vector scores; and a back end unit to receive the GMM score and generate a text output corresponding to the GMM score, the text output to be provided to a display device with which the user interacts, wherein the back end unit is to send a feedback to the score generator logic to cause the score generator logic to reduce a number of GMM scores to be calculated on a next iteration.

2. The processor of claim 1, wherein the portion of speech corresponds to an interval of the speech input having a specified duration.

3. The processor of claim 1, wherein the mixture component includes a mean vector and a variance vector and wherein the feature vector score is indicative of squared differences between values of the feature vector and corresponding values of the mean vector, weighted by corresponding value of the variance vector.

4. A processor, comprising:

a processing core to execute instruction set instructions, and including a decoder to decode instructions and a complex instruction unit including at least one integer arithmetic logic unit and at least one floating point unit to execute instructions;

a microphone;

a microcontroller to execute a speech application to group audio samples from the microphone into blocks and perform feature extraction on the group to generate feature vector data comprising a digital representation of a speech sample of a user;

an audio interface to receive the feature vector data; and a Gaussian mixture model (GMM) score generator to be invoked by the microcontroller, to generate a GMM score corresponding to the feature vector data, wherein the GMM score generator includes:

algorithm selection logic to select a first GMM scoring algorithm from a plurality of supported GMM scoring algorithms;

weighted sum of differences squared (SODS) hardware logic to compute feature vector scores indicative of differences between elements of the feature vector data and corresponding elements of a GMM component mixture, the feature vector scores based on:

a first stage including a plurality of first logic to compute a sum of difference squared value for an element of the feature vector data;

a second stage including a plurality of multipliers to compute a sum of weighted difference value for an element of the feature vector data; and a plurality of stages to perform pair-wise summations of adjacent values output by the second stage to generate a feature vector sum indicative of a weighted sum of differences squared between the feature vector data and the GMM mixture component; and a score selection block to:

receive the feature vector scores and algorithm inputs, wherein the algorithm inputs comprise a logarithmic mode input, including a first value indicative of the modeled GMM speech recognition algorithm to implement a logarithmic summation calculation to determine the GMM score, and further including a second value indicative of the modeled GMM speech recognition algorithm to implement a recursive selection between a current GMM score and an intermediate value based on the feature vector sum;

implement the first GMM scoring algorithm based on the algorithm inputs; and generate the GMM score for the first GMM scoring algorithm based on the feature vector scores; and a back end unit to receive the GMM score and generate a text output corresponding to the GMM score, the text output to be provided to a display device with which the user interacts, wherein the back end unit is to send a feedback to the GMM score generator to cause the GMM score generator to reduce a number of GMM scores to be calculated on a next iteration.

5. The processor of claim 4, wherein the plurality of supported GMM scoring algorithms include a logarithmic summation scoring algorithm.

6. The processor of claim 4, wherein the plurality of supported GMM scoring algorithms include a maximum summation scoring algorithm.

* * * * *